(12) United States Patent
Mori et al.

(10) Patent No.: US 10,169,278 B2
(45) Date of Patent: Jan. 1, 2019

(54) LIN BUS MODULE

(71) Applicant: Infineon Technologies AG, Neubiberg (DE)

(72) Inventors: Alexander Mori, Graz (AT); Christoph Seidl, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 599 days.

(21) Appl. No.: 13/956,186

(22) Filed: Jul. 31, 2013

(65) Prior Publication Data

US 2015/0039801 A1 Feb. 5, 2015

(51) Int. Cl.
G06F 13/40 (2006.01)

(52) U.S. Cl.
CPC .......... *G06F 13/40* (2013.01); *G06F 13/4072* (2013.01); Y02D 10/14 (2018.01); Y02D 10/151 (2018.01)

(58) Field of Classification Search
CPC . H04L 9/00; H04L 9/002; H04L 9/006; G06F 13/40; G06F 13/4072; Y02B 60/1228; Y02B 60/1235
USPC ........................................................ 710/305
See application file for complete search history.

(56) References Cited

U.S. PATENT DOCUMENTS

| | | | | |
|---|---|---|---|---|
| 8,625,320 B1* | 1/2014 | Argyres | ................. | G11C 15/04 365/49.1 |
| 2005/0267659 A1* | 12/2005 | Sunaga | .............. | B60H 1/00735 701/36 |
| 2005/0278608 A1* | 12/2005 | Murasawa | .......... | H04L 25/0262 714/776 |
| 2006/0039504 A1* | 2/2006 | Sicard | ................. | H04L 25/0292 375/317 |
| 2008/0218155 A1* | 9/2008 | Huang | ................ | H02M 3/1563 324/141 |
| 2009/0213057 A1 | 8/2009 | Yasuda et al. | | |
| 2010/0165699 A1* | 7/2010 | Chen | ...................... | G11C 17/16 365/96 |
| 2013/0162454 A1* | 6/2013 | Lin | ......................... | H03M 1/38 341/120 |

FOREIGN PATENT DOCUMENTS

| CN | 102545758 A | 7/2012 |
|---|---|---|
| CN | 103138982 A | 6/2013 |

OTHER PUBLICATIONS

"LIN Specification Package," Local Interconnect Network (lin), LIN Consortium, Revision 2.2A, Dec. 31, 2010, 194 pages.

* cited by examiner

*Primary Examiner* — Farley Abad
*Assistant Examiner* — Getente A Yimer
(74) *Attorney, Agent, or Firm* — Slater Matsil, LLP

(57) ABSTRACT

One aspect of the invention relates to a network node for connecting to a Local Interconnect Network (LIN). In accordance with one example of the present invention, the network node includes a bus terminal which is operably coupled to a data line for receiving a data signal, which represents serial data, via that data line. The data signal is a binary signal having high and low signal levels. The network node further includes a receiver circuit which employs a comparator to compare the data signal with a reference signal. The comparator generates a binary output signal representing the result of the comparison. The network node also includes a measurement circuit that receives the data signal and provides a first voltage signal such that it represents the high signal level of the data signal.

21 Claims, 4 Drawing Sheets

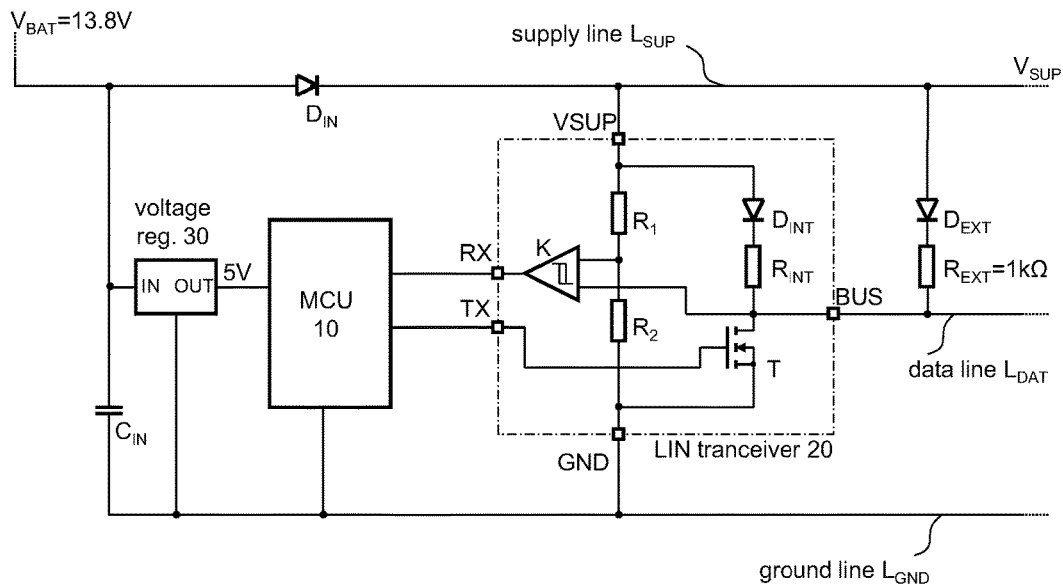
Fig. 1  LIN master node 1
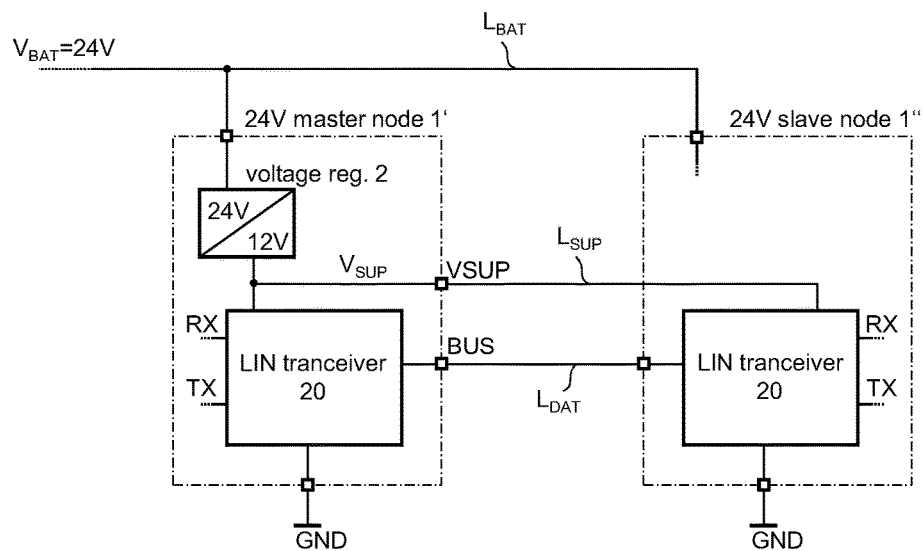
Fig. 2

LIN BUS MODULE

TECHNICAL FIELD

The present disclosure relates to the Local Interconnect Network (LIN) which is commonly used in automotive applications, particularly to LIN bus modules and devices supplied by a high supply voltage.

BACKGROUND

The Local Interconnect Network (LIN) is a serial network protocol designed for communication between different electronic modules and devices and mainly employed in automobiles. The need for a cheap serial network arose as the technologies and the facilities implemented in an automobile grew, while the Controller Area Network (CAN) bus was too expensive to be implemented in every electronic module or device in an automobile. European car manufacturers started using different serial communication topologies, which led to compatibility problems. In the late 1990s, the LIN Consortium was founded by five automakers, and the first fully implemented version of the new LIN specification (LIN version 1.3) was published in November 2002. In September 2003, LIN version 2.0 was introduced to expand capabilities and make provisions for additional diagnostics features.

LIN is a serial network (often referred to as LIN bus) including one master device (bus master) and typically up to sixteen slave devices (bus slaves). All messages are initiated by the master device with at most one slave device responding to a given message identifier. The master device may also act as a slave device by replying to its own messages. Because all communications are initiated by the master device it is not necessary to implement a collision detection. The master device may be a microcontroller, whereas the slaves may be implemented as an application-specific integrated circuit (ASIC).

Current applications combine the cost efficiency of LIN and simple sensors to create devices or modules interconnected to form small networks. These networks may be connected to a back-bone-network, i.e., CAN in automobiles. The general terms electronic devices and electronic modules are used as synonyms herein and are often referred as electronic control units (ECUs), particularly in automotive applications. The ECUs are also referred to as "nodes" as they form the nodes of a network in accordance with the LIN specification.

The LIN specification was designed to allow very cheap hardware-nodes which are used within a network. LIN is a low-cost, single-wire network based on ISO 9141. The LIN master nodes are often implemented using microcontrollers with either UART capability or dedicated LIN interfaces. The microcontroller generates all the LIN data (in accordance with the LIN protocol) using appropriate software and is connected to the LIN network via a LIN transceiver. Operating as a LIN master node may only be part of the possible functionality of the device. However, the LIN hardware may include the mentioned transceiver and works as a pure LIN node without added functionality.

As LIN slave nodes should be as cheap as possible, they may generate their internal clocks by using RC oscillators instead of crystal oscillators. One well-known LIN transceiver is Freescale's MC33399. The LIN consortium specified the LIN with regard to the physical and the data link layer (i.e., layers 1 and 2 of the OSI model). As LIN has been primarily designed for automobiles the LIN standard defines the supply voltages for a LIN node to be between 7 volts and 18 volts (typically 12 volts), which makes LIN standard-compliant nodes unsuitable for applications in trucks (lorries) and busses as these typically use power supplies which provide supply voltages of 24 volts. The present disclosure addresses solutions to problems arising when connecting standard LIN nodes to a non-standard 24 volt power supply.

SUMMARY OF THE INVENTION

One aspect of the invention relates to a network node for connecting to a Local Inter-connect Network (LIN). In accordance with one example of the present invention, the network node includes a bus terminal which is operably coupled to a data line for receiving a data signal, which represents serial data, via that data line. The data signal is a binary signal having high and low signal levels. The network node further includes a receiver circuit which employs a comparator to compare the data signal with a reference signal. The comparator generates a binary output signal representing the result of the comparison. The network node also includes a measurement circuit that receives the data signal and provides a first voltage signal such that it represents the high signal level of the data signal. A scaling circuit is provided to generate the reference signal from the first voltage signal.

In accordance with another example of the present invention, the network node includes a bus terminal which is operably coupled to a data line for receiving a data signal, which represents serial data, via that data line. The data signal is a binary signal having high and low signal levels. The network node further includes a receiver circuit which employs a comparator to compare the data signal with a reference signal. The comparator generates a binary output signal representing the result of the comparison. The network node also includes a measurement circuit that receives the data signal and provides a first voltage signal such that it represents the high signal level of the data signal. A pull-up circuit is coupled to the data line and provides a controllable load current at the bus terminal. The controllable load current passes through the pull-up circuit when the data line is pulled to a low level, wherein the controllable load current is controlled by the first voltage signal.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 1 illustrates a circuit diagram of an exemplary LIN master node operating with a 12 V power supply;

FIG. 2 illustrates an exemplary LIN network including a LIN slave node and a LIN master node operating with a 24 V power supply;

DETAILED DESCRIPTION OF ILLUSTRATIVE EMBODIMENTS

Figure 3A:
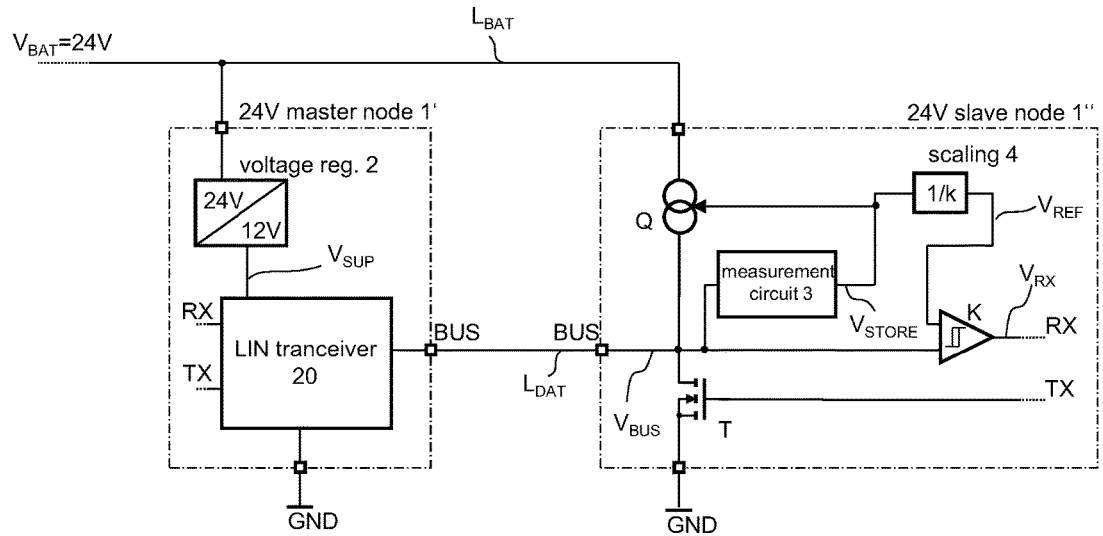
FIGS. 3A and 3B illustrate two exemplary LIN networks, each including a LIN slave node in accordance with one example of the present invention and a LIN master node operating with a 24 V power supply.

FIG. 1 illustrates an exemplary circuit of a LIN node. The LIN node 1 includes a microcontroller 10 (MCU or microcontroller unit) to allow the software implementation of the comparably complex functionality necessary for a master LIN node. A slave LIN node may operate without a dedicated microcontroller and may include some sensor circuitry instead. Regardless of the actual purpose of a LIN node, a LIN node will always include a LIN transceiver 20 which may be a separate integrated circuit or included in the MCU 10. Depending on the application, the LIN transceiver may also be formed on a printed circuit board using discrete circuit components.

In the present example, the LIN transceiver 20 has a supply terminal VSUP, a ground terminal GND (wherein ground generally relates to a reference potential), a receive terminal RX, a transmit terminal TX, and a LIN bus terminal labeled BUS. According to the LIN specification, the supply voltage $V_{SUP}$ which is to be applied to the supply terminal VSUP is between 7 volts and 18 volts. In automotive applications this supply voltage is provided by an automotive battery which provides typical a voltage $V_{BAT}$ (when fully charged) between 13.8 and 14.4 volts. The supply line $L_{SUP}$ which is connected to the supply terminal $V_{SUP}$ may be coupled to the battery via a diode $D_{IN}$ which provides protection against reverse polarity. Thus, the supply voltage $V_{SUP}$ may be about 0.7 volts (i.e., the forward voltage of a silicon diode) lower than the battery voltage $V_{BAT}$. Microcontrollers usually operated at supply voltages lower than 12 volts. General purpose microcontrollers typically operate at supply voltages around 5 volts or less. Therefore, the master LIN node 1 illustrated in FIG. 1 includes a voltage regulator 30 connected between, e.g., the battery (voltage $V_{BAT}$) and the supply pin of the MCU 10. The voltage regulator 30 provides the low supply voltage required for the MCU 10, e.g., 5 volts. The ground line $L_{GND}$ is connected to the ground terminal GND of the LIN transceiver 20 and also the respective ground terminals of the MCU 10 and the voltage regulator 30. A buffer capacitor $C_{IN}$ may be coupled between the supply line $L_{SUP}$ and the ground line $L_{GND}$ in order to suppress transient glitches in the supply voltage $V_{SUP}$. In automotive applications the ground line $L_{GND}$ may be connected to the body of the car.

The LIN bus line $L_{DAT}$ is connected to the bus terminal BUS of the LIN transceiver. As the LIN bus terminal BUS provides an open collector (or open drain) output, a pull-up resistor is needed. In the present example an external pull-up resistor $R_{EXT}$ (external to the LIN transceiver 20) is coupled between the LIN data line $L_{DAT}$ and the supply line $L_{SUP}$ via a diode $D_{EXT}$. Serial data can be communicated bi-directionally across the bus line $L_{DAT}$ in accordance with the LIN specification. The receive terminal RX and the transmit terminal TX of the LIN transceiver 20 are connected to respective terminals of the MCU 10. Serial data received from the LIN data line $L_{DAT}$ is forwarded to the MCU 10 via the receive terminal RX whereas the MCU 10 is configured to provide serial data, which is to be sent across the LIN data line $L_{DAT}$, at the transmit terminal TX.

The LIN transceiver 20 includes a receiver circuit and a transmitter circuit, which together form an interface circuit between the receive output and the transmit input terminals RX, TX and the LIN bus terminal BUS. The receiver circuit includes a comparator K with hysteresis and a reference voltage source which is, in the present example, a simple voltage divider composed of the resistors $R_1$ and $R_2$. The resistors $R_1$ and $R_2$ are coupled in series between the supply terminal VSUP and the ground terminal GND, wherein the reference voltage $V_{REF}$ for the comparator K is tapped at the middle tap of the voltage divider. Thus, the reference voltage $V_{REF}$ equals $V_{SUP} \cdot R_2 \cdot (R_1 + R_2)$, wherein the resistors $R_1$ and $R_2$ may have the same resistance and thus $V_{REF} = 0.5 \cdot V_{SUP}$. Although the factor 0.5 may be different in different implementations of the LIN transceiver 20, the reference voltage is proportional to the supply voltage $V_{SUP}$ in accordance with the LIN standard. One input of the comparator K is connected to the LIN bus terminal BUS while another input of the comparator K is supplied with the reference voltage $V_{REF}$. The output of the comparator K is connected to the receive terminal RX. The comparator sets the voltage at the receive terminal RX to a high level when the voltage level at the LIN bus terminal BUS exceeds a first threshold defined by $V_{REF} + V_H$, and sets the voltage at the receive terminal RX to a low level when the voltage level at the LIN bus terminal BUS falls below a second threshold defined by $V_{REF} - V_H$, wherein the voltage $V_H$ represents the mentioned hysteresis of the comparator which may be comparably small (as compared to $V_{REF}$). However, a hysteresis may help to avoid an undesired toggling when the voltage level at the LIN bus terminal BUS is close to the reference voltage $V_{REF}$. The voltage levels provided by the comparator K may be in accordance with the requirements of the MCU 10. As an option, a circuit for adjusting the voltage level (not shown in FIG. 1) may be coupled between the receive terminal RX of the LIN transceiver and the corresponding pin of the MCU 10.

The transmitter circuit of the LIN transceiver may include a single transistor T. In the present example of FIG. 1, a MOS transistor is used. A bipolar junction transistor could, however, also be used. Moreover, more sophisticated transmitter circuits may be applicable. The transistor load path is connected between the ground terminal GND and the LIN bus terminal BUS, wherein an internal pull-up resistor $R_{INT}$ may be connected to the supply terminal VSUP via internal diode $D_{INT}$ (the pull-up resistor is referred to as internal as it is internal of the LIN transceiver 20). In the present example, the series circuit of internal pull-up resistor $R_{INT}$ and diode $D_{INT}$ is connected in parallel to the corresponding series circuit of external pull-up resistor $R_{INT}$ and diode $D_{EXT}$. The resistance of the internal pull-up resistor $R_{INT}$ is, however, much higher, e.g., 30 kΩ, than the external pull-up resistor (e.g., 1 kΩ).

The control electrode of the transistor T (e.g., its gate electrode or its base electrode) is coupled to the transmit terminal TX. Thus, the transistor T is switched on, when a high level is applied to the terminal TX (e.g. by the MCU 10), whereas the transistor T is switched off, when a low level is applied to the terminal TX. In first case (transistor T is switched on), the transistor T pulls the potential of the LIN bus terminal BUS down to (approximately) ground potential, whereas in the second case (transistor T is switched off), the pull-up resistors $R_{INT}$ (and/or $R_{EXT}$) pull(s) the potential of the of the LIN bus terminal BUS up to (approximately) supply potential $V_{SUP}$ (when neglecting the forward voltage drop across the diode $D_{INT}$ in the pull-up current path). An inverter may be coupled between the transmit terminal TX and the control electrode of the transistor T to compensate for the inverting characteristic of the transistor T. However, the function provided by the optional inverter may be also be implemented in the MCU 10.

As mentioned above, the LIN standard requires the supply voltage $V_{SUP}$ to be between 7 and 18 volts. As a consequence, LIN compliant network nodes (or LIN transceivers) either cannot be operated at higher voltages (higher than 18 volts) at all or can at least not be operated in a LIN standard-compliant manner. Operating a LIN transceiver circuit at, e.g., 24 volts (which is the typical supply voltage provided in trucks/lorries) in a LIN "standard-like" manner is undesired for several reasons. The LIN standard limits the slew rate for transitions from a low level to a high level (and vice versa) which results in a reduced maximum communication speed when using higher voltages. Furthermore, many LIN standard-compliant modules cannot be used and expensive customer-specific solutions have to be used. Generally, electromagnetic interferences (EMI) may increase at higher voltages, which has an undesired impact on electromagnetic compatibility (EMC) of the LIN nodes. As a consequence, operating LIN standard-like transceiver circuits at high supply voltages (higher than 18 volts) is not feasible (or at least highly undesirable) in many applications, particularly for the use in trucks (lorries).

Another option is to generate a lower, LIN standard-compliant supply voltage $V_{SUP}$ (e.g., 12 volts) within a LIN master node and to operate all LIN slave nodes connected to the master node at this standard-compliant supply voltage $V_{SUP}$. This solution, which is depicted in FIG. 2, allows to use cheap LIN standard-compliant devices (e.g., integrated circuits) to implement a LIN master node. FIG. 2 illustrates a LIN master node 1' as well as a LIN slave node 1" which are interconnected via a LIN bus data line $L_{DAT}$ to exchange serial data in a LIN standard-compliant manner. Each network node (master node 1', slave node 1") includes a LIN transceiver 20 as described above with respect to FIG. 1. However, the MCU or other circuitry which may be coupled to the receiver terminal RX and the transmit terminal TX (as well as the external pull-up resistors) have been omitted as these are not necessary for the present discussion. A battery voltage $V_{BAT}$ of about 24 volts is the only supply voltage available to supply the LIN nodes 1' and 1". Therefore, the LIN master node 1' includes a voltage regulator 2 which is configured to generate a LIN standard-compliant supply voltage $V_{SUP}$ (of e.g., 12 volts) from the battery voltage $V_{BAT}$. The voltage regulator may be a linear voltage regulator. However, any other type of voltage regulator may be applicable. It should be noted that, in the present example, the LIN standard-compliant supply voltage (e.g., 12 volts), which is generated by the voltage regulator 2, is referred to as supply voltage $V_{SUP}$ whereas the high supply voltage (e.g., 24 volts) is referred to as battery voltage $V_{BAT}$. However, the source of the high supply voltage is not necessarily a battery.

Using the regulated LIN standard-compliant supply voltage $V_{SUP}$ allows for the usage LIN standard-compliant devices such as a LIN standard-compliant LIN transceiver 20. However, when using the voltage regulator 2 to provide a separate LIN compliant supply voltage $V_{SUP}$ in the master LIN node 1' the problem arises that this supply voltage $V_{SUP}$ has to be supplied to the slave nodes 1" as the LIN transceiver in each LIN node derives its reference voltage (See FIG. 1, reference voltage $V_{REF}$) from the supply voltage, e.g., $V_{REF}$=0.5·$V_{SUP}$. One solution would be to use an additional supply line $L_{SUP}$ between the LIN nodes to "distribute" the LIN compliant supply voltage to all LIN nodes connected to the master node. This would, however, entail additional wires for connecting the individual LIN nodes which is undesirable in many applications.

Figure 3B:
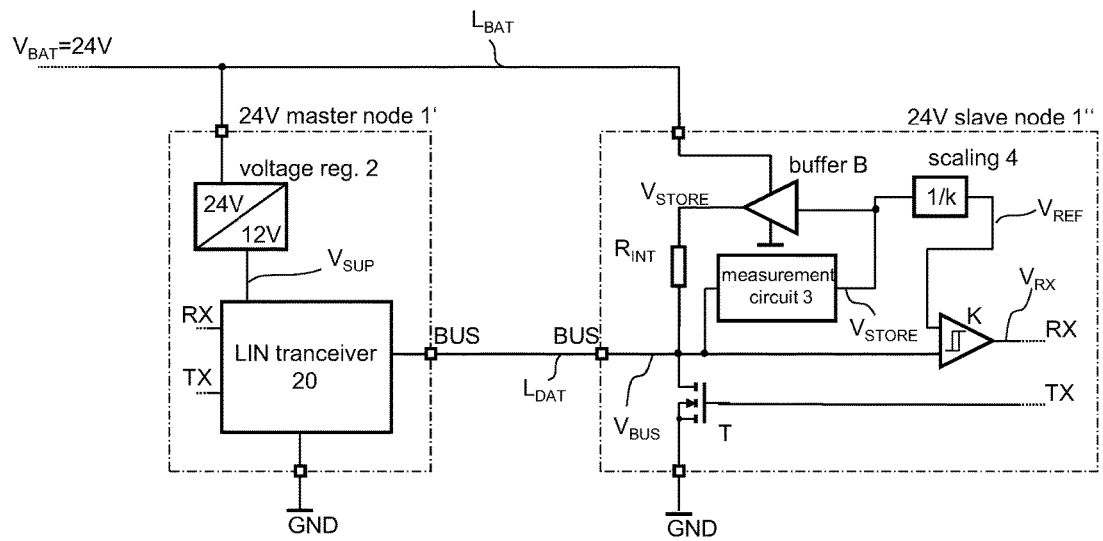

Similar to the example of FIG. 2, the examples of FIG. 3 illustrate a LIN including a LIN master node 1' and a LIN slave node 1" which are interconnected via a LIN bus data line $L_{DAT}$ to exchange serial data in a LIN standard-compliant manner. FIGS. 3A and 3B (collectively referred to as FIG. 3) illustrate two very similar examples providing essentially the same function. The LIN master node 1' (which is identical in FIG. 3A and FIG. 3B) is the same as the master node in the previous example of FIG. 2 whereas the slave node 1" includes additional circuitry for measuring the LIN standard-compliant supply voltage $V_{SUP}$ (which is generated by the LIN master node 1') from the signal level at the LIN bus terminal BUS. Therefore, the separate supply line $L_{SUP}$ between the master node 1' and the slave node 1" (see FIG. 2) is not needed and can be omitted.

Similar to the LIN transceiver (see LIN transceiver 20) of FIG. 1, the slave node 1" includes a bus terminal BUS which is coupled to a LIN data line $L_{DAT}$ for receiving a data signal $V_{BUS}$ representing serial data from the LIN master node 1'. The data signal $V_{BUS}$ is a binary signal having high a low signal levels. The low signal level equals approximately ground potential (i.e., zero volts) and the high signal level equals the LIN standard-compliant supply voltage $V_{SUP}$ generated in the master node 1'. The slave node 1" further includes a receiver circuit, which includes a comparator K. The comparator K is configured to compare the data signal $V_{BUS}$ received from the LIN data line $L_{DAT}$ with a reference signal $V_{REF}$, wherein the comparator K generates a binary output signal (labeled $V_{RX}$) which represents the result of the comparison. As mentioned above with respect to FIG. 1, the reference voltage is, according to the LIN standard, proportional to the supply voltage $V_{SUP}$ (in the example of FIG. 1 a voltage divider is used to downscale the supply voltage in order to obtain the reference voltage). In accordance with the present example, the reference voltage $V_{REF}$ is derived from the data signal $V_{BUS}$, which is received from the master node 1' via the LIN data line $L_{DAT}$. For this purpose, the slave node 1" includes a measurement circuit 3 that receives the data signal $V_{BUS}$ and is configured to provide a measured voltage signal $V_{STORE}$ that represents the high signal level (i.e., approximately the supply voltage $V_{SUP}$) of the data signal $V_{BUS}$. A scaling circuit is connected to the measurement circuit 3 and configured to generate the reference signal $V_{REF}$ from the measured voltage signal $V_{STORE}$. For example, the scaling circuit may be a simple buffer amplifier receiving he measured voltage signal $V_{STORE}$ and providing an attenuated signal (e.g., $V_{STORE}$/2, when the attenuation factor k=2) as reference signal. Different implementations of the measurement circuit 3 will be discussed below with reference to FIGS. 5, 6 and 7. The general function of the measurement circuit is illustrated by means of the timing diagrams depicted in FIG. 4.

Figure 4:
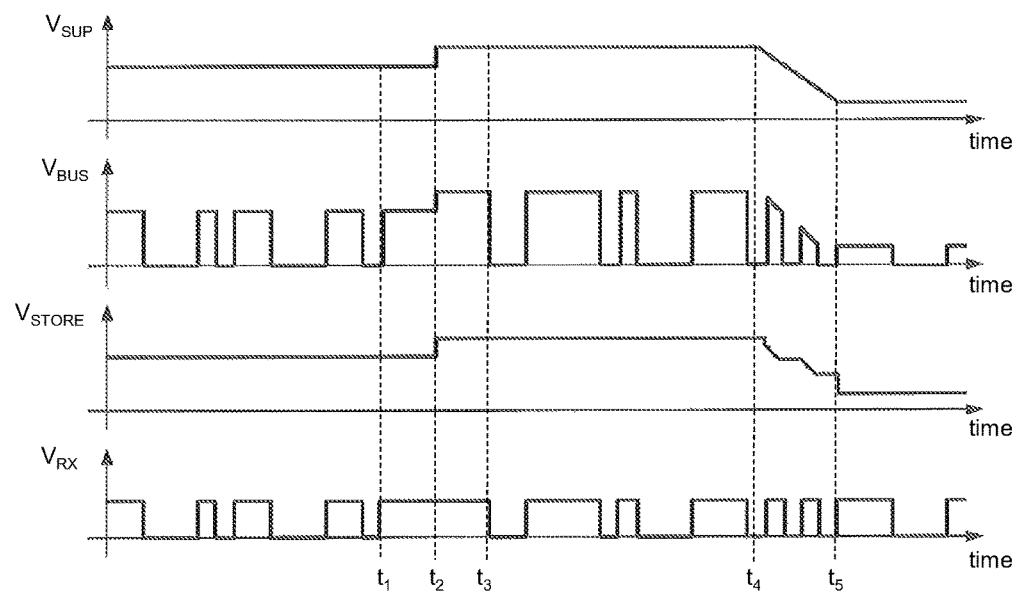
FIG. 4 illustrates the function of the LIN slave node of FIG. 3 using timing diagrams of the relevant signals.

The top diagram of FIG. 4 illustrates one exemplary waveform of a standard-compliant supply voltage $V_{SUP}$ which may be, as in the examples of FIG. 3, provided by a voltage regulator in the LIN master node 1'. Although the supply voltage $V_{SUP}$ is provided by a voltage regulator it may still vary for different reasons. For example the battery voltage $V_{BAT}$ (which is the input voltage for the voltage regulator) may be very low during cold-crank conditions and, as a consequence, the supply voltage $V_{SUP}$ may also drop. Generally, the power supply rejection ratio (PSRR) of the voltage regulator, which generates the supply voltage $V_{SUP}$, may be low in a low cost implementation, and thus the supply voltage $V_{SUP}$ may vary in response to a varying battery voltage $V_{BAT}$. In the example of FIG. 4 the supply voltage makes a small upward step at time instant $t_2$ and gradually falls beginning at time instant $t_4$. From time instant $t_5$ onward, the supply voltage $V_{SUP}$ remains constant. The second waveform represents the resulting data signal $V_{BUS}$ generated on the LIN bus data line $L_{DAT}$ by the master node 1. The data signal $V_{BUS}$ is a binary signal having low and high signal levels (representing the binary numbers 0 and 1) wherein a low level equals almost zero volts (i.e., ground potential) and a high level corresponds to the supply voltage $V_{SUP}$. Therefore the high level of the data signal $V_{BUS}$ rises at time instant $t_1$ and falls between time instants $t_4$ and $t_5$ in accordance with the corresponding supply voltage $V_{SUP}$. The third waveform in FIG. 4 illustrates the measured voltage signal $V_{STORE}$ provided by the measurement circuit. The measured voltage $V_{STORE}$ follows (i.e., is equal) to the data signal $V_{BUS}$ during the time intervals in which the level of the data signal $V_{BUS}$ indicates a high signal level (representing a binary number 1). When the data signal $V_{BUS}$ falls to a low level, the measured voltage is maintained (i.e., held at a constant level) until the level of the data signal $V_{BUS}$ again indicates a high signal level. In essence, the function of the measurement circuit corresponds to a sample and hold circuit or a peak detector. The waveform in the bottom diagram of FIG. 4 illustrates the comparator output signal $V_{RX}$ corresponding to the data signal $V_{BUS}$. The output signal $V_{RX}$ has a well-defined and constant high level (e.g., 5 volts) suitable for further signal processing, e.g., using a microcontroller or other digital circuitry.

Referring again to the example of FIG. 3A, the slave node 1" further includes a transmitter circuit which is very similar to the example of FIG. 1. A transistor T (e.g., a MOSFET) is coupled between the ground terminal GND and the LIN bus terminal BUS, while the control electrode (e.g., gate electrode) of the transistor is coupled to a transmit terminal TX analogously to the example of FIG. 1. Different from the example of FIG. 1, the series circuits including a pull-up resistor and a diode are replaced by a controllable current source Q that provides a controllable pull-up current which is set dependent on the measured voltage $V_{STORE}$. In the example of FIG. 3B the pull-up resistor $R_{INT}$ is coupled between the LIN bus terminal BUS (i.e., the LIN data line $L_{DAT}$) and the output of a buffer amplifier B that is configured to buffer the measured voltage $V_{STORE}$. In other words, the buffer amplifier B provides the voltage $V_{STORE}$ at its output at a low output resistance which allows providing the pull-up current through the pull-up resistor $R_{INT}$ while maintaining the output voltage essentially at $V_{STORE}$.

Figure 5:
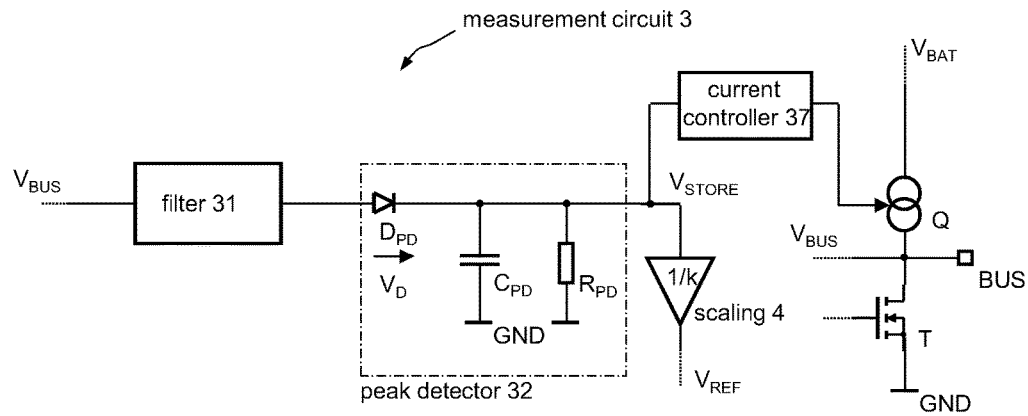
FIG. 5 illustrates an exemplary measurement circuit for measuring the LIN supply voltage from the data signal received from the LIN data line.
Figure 6:
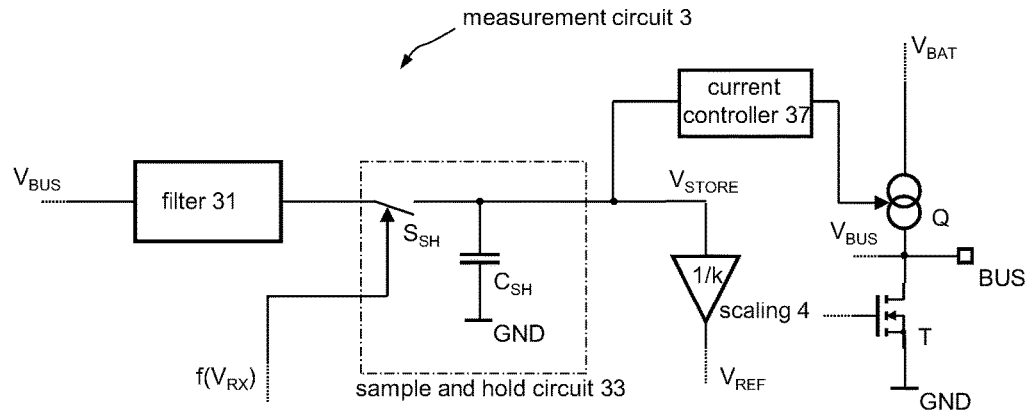
FIG. 6 illustrates another exemplary measurement circuit for measuring the LIN supply voltage from the data signal received from the LIN data line.
Figure 7:
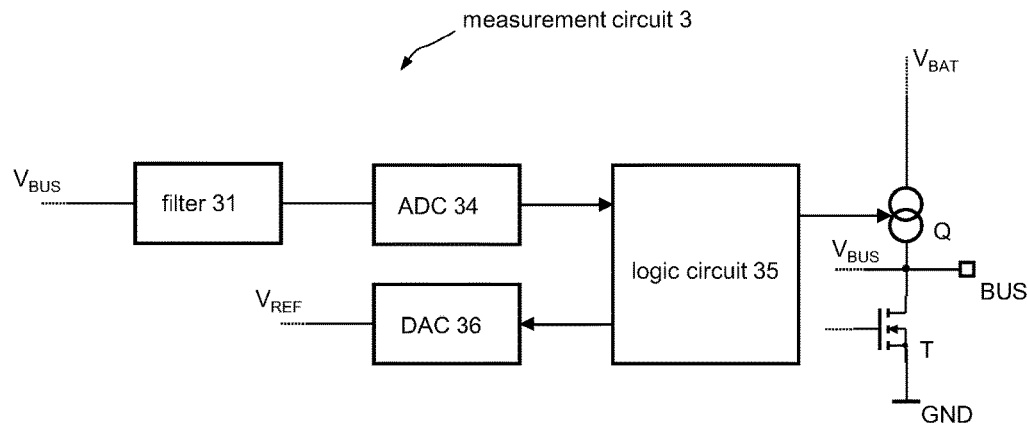
FIG. 7 illustrates another alternative to the example of FIG. 6 using a digital implementation.

FIGS. 5, 6 and 7 illustrate different examples of measurement circuits 3 which may be used in different implementations of a LIN slave node 1" as shown, e.g., in FIG. 3. The example of FIG. 7 may be partly software-implemented using an appropriate processor (e.g., a microcontroller) whereas the examples of FIGS. 5 and 6 are fully hardware-implemented. However, also in the example of FIG. 7, a pure hardware based implementation may be used (i.e., without the need for a programmable processor). In the example of FIG. 5 the measurement circuit 3 includes a filter 31 which receives the LIN data signal $V_{BUS}$ via the LIN data line $L_{DAT}$. The filter 31 is configured to provide signal conditioning to facilitate further signal processing. In particular the filter 31 performs a low-pass filtering with a cut-of frequency in the rage of approximately 100 kHz to 1 MHz to eliminate high-frequency transient noise (e.g., glitches, etc.). The filtered signal LIN data signal provided by the filter 31 is supplied to a peak detector 32 which, in the present example, in composed of (inter alia) a diode $D_{PD}$, a capacitor $C_{PD}$ and a resistor $R_{PD}$. The capacitor $C_{PD}$ and the resistor $R_{PD}$ are connected in parallel, wherein a first terminal of the capacitor $C_{PD}$ is coupled to the filter 31 via the diode $D_{PD}$ and a second terminal of the capacitor is coupled to ground potential. The measured signal $V_{STORE}$ representing the LIN standard-compliant supply voltage $V_{SUP}$ used by the LIN master node 1' can be tapped at the first terminal of the capacitor $C_{PD}$. The time constant $\tau_{PD}$ ($\tau_{PD}=R_{PD} \cdot C_{PD}$) of the parallel circuit of capacitor $C_{PD}$ and resistor $R_{PD}$ should be chosen that the voltage drop $V_{STORE}$ across the capacitor $C_{PD}$ does not significantly change during time periods in which the LIN data signal $V_{BUS}$ is at a low signal level. Thus, the measured voltage $V_{STORE}$ represents the high signal level of the LIN data signal $V_{BUS}$ (reduced by the forward voltage $V_D$ of the diode $D_{PD}$).

The measured voltage $V_{STORE}$ may be used to derive the reference voltage $V_{REF}$ to be used by the comparator K (see FIG. 3A). The measured voltage $V_{STORE}$ may also be used to control the current $i_P$ provided by the controllable current source Q. The controllable current source Q may be controlled such that the current $i_P$ equals $(V_{STORE})/R_{INT}$, wherein $R_{INT}$ denotes the resistance of the internal pull-up resistor (e.g., $R_{EXT}$=35 k$\Omega$) used in the example of FIG. 1 (diode $D_{INT}$ shown in FIG. 1 is not used in slave devices). Thus, when the transistor T pulls down the potential at the LIN bus terminal BUS, the current through the current source Q would be approximately the same as the current which would flow in a LIN node operating at a LIN standard-compliant supply voltage instead of the high battery voltage $V_{BAT}$.

The example illustrated in FIG. 6 is mainly identical to the example of FIG. 5. In the measurement circuit 3 of FIG. 6 a sample and hold circuit 33 (S/H circuit) is employed instead of the peak detector 32. The sample and hold circuit 33 includes a capacitor $C_{SH}$ which is coupled between the output of the filter 31 (via an electronic switch $S_{SH}$) and ground potential. The switch $S_{SH}$ may be switched on and off synchronously to the signal $V_{RX}$ provided at the output of the comparator K (see FIGS. 1 and 3). While the comparator output signal $V_{RX}$ is at a high level, the LIN data signal $V_{BUS}$ also is at a high level and the switch $S_{SH}$ is closed, and thus the voltage $V_{STORE}$ across the capacitor $C_{SH}$ equals the high voltage level of the LIN data signal $V_{BUS}$. A transition of the comparator output signal $V_{RX}$ to a low level indicates a corresponding transition of the LIN data signal $V_{BUS}$ a low level. The switch $S_{SH}$ is opened in response to the transition or, alternatively, already before such a transition (and remains open while the data signal $V_{BUS}$ is at a low level). Thus, the capacitor voltage $V_{STORE}$ is maintained at the level immediately before opening the switch $S_{SH}$. This function is also represented by the timing diagrams of FIG. 4. Generally, the signal controlling the switching operation of the switch $S_{SH}$ can be regarded as a function $f(\bullet)$ of the comparator output signal $V_{RX}$. For example, the switch $S_{SH}$ may be opened after the comparator output signal $V_{RX}$ has been at a high level for a specified time, and again closed in response to a rising edge if the signal $V_{RX}$. The current controller 37 for controlling the pull-up current $i_P$ is identical to the previous example of FIG. 5. A scaling circuit 4 (e.g., attenuation factor k=2, 1/k=0.5) may be used to derive the reference voltage $V_{REF}$ from the measured voltage $V_{STORE}$. The scaling circuit 4 may include, for example, a buffer amplifier having a gain lower than 1. Furthermore, the scaling circuit 4 may compensate for the voltage drop across the electronic switch $S_{SH}$ (or across the diode $D_{PD}$ when employed in the previous example).

The example of FIG. 7 illustrates a digital implementation of the measurement circuit using an analog-to-digital converter 34 (ADC), a logic circuit 35 (e.g., a microcontroller), and a digital-to-analog converter 36 (DAC) to implement the functionality illustrated in FIG. 4, i.e., the measurement of the high signal level of the LIN data signal $V_{BUS}$ and deriving the reference voltage $V_{REF}$ therefrom in accordance with the LIN standard specification. In accordance with the present example, the LIN data signal $V_{BUS}$ available at the LIN bus terminal BUS of the slave node 1" (see FIG. 3) is pre-conditioned using a filter 31 like in the previous examples. However, the filtered LIN data signal is then digitized using the ADC 34 and the resulting digital word is supplied to the logic circuit 35, which may be, for example, a microcontroller. The logic circuit 35 may be configured to discriminate between high signal levels and low signal levels of the digitized LIN data signal, e.g., by detection of falling and rising edges in the signal. Alternatively, the logic circuit 35 may be configured to digitally perform the function of the sample and hold circuit 33 or the peak detector 32 used in the previous examples. The measured voltage $V_{STORE}$ is held digitally within the logic circuit 35, which is also configured to digitally down-scale this voltage (and perform an optional offset-correction if appropriate) to obtain the reference voltage $V_{REF}$ as a digital word. The analog reference voltage $V_{REF}$ is then generated by the DAC 36, which is also coupled to the logic circuit 35 and receives the digital representation of the reference voltage from the logic circuit 35. The logic circuit 35 may also be configured to calculate the appropriate pull-up current $i_P$ and control the current source Q in the pull-up current path accordingly (in a similar manner as the current controller 37 in the previous examples). The current source Q may be, for example, a current-output DAC which is digitally controlled by the logic circuit 35.

It has to be noted that, regardless of the actual implementation of the measurement circuit 3 (see FIGS. 5 to 7) a LIN slave in accordance with the example of FIG. 3 provides a high robustness against variations (due to distortions, crank, etc.) of the high (e.g., 24 volt) battery voltage, as the reference voltage is always derived from the measured voltage $V_{STORE}$ which represents the high level voltage of the LIN data signal present at the LIN data line $L_{DAT}$. During start-up (power on) of the slave 1" (see FIG. 3) a reliable measurement (see measurement circuit 3) is not yet possible. Therefore, the voltage signal $V_{STORE}$ may, for example, be set to a pre-defined voltage level during a specific time interval after power-on of the network node (i.e., the LIN slave node 1"). However, other options may also be suitable.

Although various exemplary embodiments of the invention have been disclosed, it will be apparent to those skilled in the art that various changes and modifications can be made that will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Furthermore, the methods of the invention may be achieved in either all software implementations using the appropriate processor instructions or in hybrid implementations that utilize a combination of hardware logic and software logic to achieve the same results. Such modifications to the inventive concept are intended to be covered by the appended claims.

What is claimed is:

1. A network node for connecting to a Local Interconnect Network (LIN), the network node comprising:
a bus terminal operably coupled to a data line to receive a data signal representing serial data via the data line, the data signal having a high signal level and a low signal level;
a receiver circuit coupled to the bus terminal, the receiver circuit including a comparator having a first input coupled to the bus terminal and a second input configured to receive a reference signal, wherein the comparator is configured to compare the data signal with the reference signal, and the comparator generates a binary output signal representing a result of the comparison;
a measurement circuit having an input coupled to the bus terminal, the measurement circuit configured to measure an amplitude of the high signal level of the data signal and to provide a first voltage signal at an output of the measurement circuit, the first voltage signal having a voltage proportional to the high signal level of the data signal received on the data line via the bus terminal; and
a scaling circuit having an input coupled to the output of the measurement circuit and an output coupled to the second input of the comparator, the scaling circuit configured to generate the reference signal from the first voltage signal, wherein the reference signal is provided at the output of the scaling circuit, and the reference signal is proportional to the first voltage signal.

2. The network node of claim 1, wherein the measurement circuit includes a sample and hold circuit configured to receive the data signal and also configured
to provide, as the first voltage signal, a voltage level of the data signal while the voltage level of the data signal is at the high signal level; and
to maintain the level of the first voltage signal at the high signal level while the data signal is at the low signal level.

3. The network node of claim 2, wherein the level of the first voltage signal is maintained at the high signal level at least until a rising edge in the data signal.

4. The network node of claim 1, wherein the measurement circuit is configured to provide the first voltage signal and a pre-defined voltage level during a time interval after power-on of the network node.

5. The network node of claim 1, wherein a low or a high signal level of the data signal is detected by monitoring the level of the binary output signal.

6. The network node of claim 1 wherein the scaling circuit includes a buffer amplifier having a gain lower than unity.

7. A network node for connecting to a Local Interconnect Network (LIN), the network node comprising:
a bus terminal operably coupled to a data line to receive a data signal representing serial data via the data line, the data signal having a high signal level a low signal level;
a receiver circuit coupled to the bus terminal, the receiver circuit including a comparator having a first input coupled to the bus terminal and a second input configured to receive a reference signal, wherein the comparator is configured to compare the data signal with the reference signal, and the comparator generates a binary output signal representing a result of the comparison;

a measurement circuit having an input coupled to the bus terminal, the measurement circuit configured to measure an amplitude of the high signal level of the data signal and to provide a first voltage signal at an output of the measurement circuit, the first voltage signal having a voltage proportional to the high signal level of the data signal received on the data line via the bus terminal;

a scaling circuit configured to generate the reference signal from the first voltage signal, wherein the reference signal is provided at the output of the scaling circuit, the output of the scaling circuit is coupled to the second input of the comparator, and the reference signal is proportional to the first voltage signal; and a pull-up circuit coupled to the data line and configured to provide a controllable load current at the bus terminal passing through the pull-up circuit when the data line is pulled to the low signal level, the controllable load current being controlled by the first voltage signal.

8. The network node of claim 7, wherein the pull-up circuit includes a controllable current source coupled between the data line and a supply terminal, the controllable current source being responsive to the first voltage signal and configured to provide, when the data line is pulled to a low level, a current equaling a fraction of the first voltage signal and a resistance value.

9. The network node of claim 8, wherein the resistance value has a predefined constant value.

10. The network node of claim 7, wherein the pull-up circuit includes
a buffer amplifier coupled to the measurement circuit and configured to provide, at its output, the first voltage signal; and
a pull-up resistor coupled between the data line and the output of the buffer amplifier.

11. The network node of claim 7, wherein the scaling circuit includes a voltage divider.

12. The network node of claim 10, wherein a voltage divider is coupled to the output of the buffer amplifier and to provide the reference signal at a middle tap of the voltage divider.

13. The network node of claim 7, wherein the measurement circuit includes a peak detector, configured to provide, as the first voltage signal, a signal representative of a peak of the data signal.

14. The network node of claim 7, wherein the measurement circuit includes a sample and hold circuit, configured to sample the data signal at times at which the data signal is at a high level, and to hold the sampled data signal as long as the data signal is at a low level.

15. The network node of claim 7, wherein the measurement circuit includes an analog-to-digital converter configured to digitize the data signal.

16. The network node of claim 15, wherein the measurement circuit includes a digital-to-analog-converter configured to generate the first voltage signal dependent from the digitized data signal.

17. The network node of claim 7, wherein the measurement circuit includes a peak detector configured to provide, as the first voltage signal, a signal proportional to a peak voltage of the data signal.

18. The network node of claim 17, wherein the peak detector comprises a diode coupled between and input and an output of the peak detector and a capacitor coupled between the output of the peak detector and a reference voltage node.

19. The network node of claim 7, the reference signal is a fraction of the high signal level of the data signal.

20. The network node of claim 1, wherein the scaling circuit comprises a voltage divider.

21. The network node of claim 1, wherein the reference signal is a fraction of the high signal level of the data signal.

* * * * *